(12) United States Patent
Wotherspoon et al.

(10) Patent No.: US 7,023,821 B2
(45) Date of Patent: Apr. 4, 2006

(54) VOICE OVER IP PORTABLE TRANSRECEIVER

(75) Inventors: Kent Wotherspoon, Winnipeg (CA); Gerald Callow, Winnipeg (CA)

(73) Assignee: Symnbol Technologies, Inc., Holtsville, NY (US)

( * ) Notice: Subject to any disclaimer, the term of this patent is extended or adjusted under 35 U.S.C. 154(b) by 83 days.

(21) Appl. No.: 10/338,938

(22) Filed: Jan. 8, 2003

(65) Prior Publication Data

US 2003/0193930 A1 Oct. 16, 2003

Related U.S. Application Data

(60) Provisional application No. 60/372,219, filed on Apr. 12, 2002.

(51) Int. Cl.
*H04Q 7/00* (2006.01)

(52) U.S. Cl. ...................................... 370/329; 370/338

(58) Field of Classification Search ................ 370/328, 370/329, 338, 347, 348, 352
See application file for complete search history.

(56) References Cited

U.S. PATENT DOCUMENTS

| 4,553,263 | A | * | 11/1985 | Smith et al. ................. 455/509 |
| 5,793,749 | A | * | 8/1998 | Helwig et al. ............... 370/241 |
| 5,852,405 | A | * | 12/1998 | Yoneda et al. ......... 340/825.02 |
| 6,005,851 | A | * | 12/1999 | Craddock et al. ............ 370/329 |
| 6,230,010 | B1 | * | 5/2001 | Morris .................... 455/426.1 |
| 6,240,140 | B1 | * | 5/2001 | Lindbergh et al. .......... 375/260 |
| 6,353,611 | B1 | * | 3/2002 | Norris et al. ................ 370/356 |
| 6,393,001 | B1 | * | 5/2002 | Miyata ........................ 370/316 |
| 6,456,973 | B1 | * | 9/2002 | Fado et al. .................. 704/260 |
| 6,493,335 | B1 | * | 12/2002 | Darcie et al. ................ 370/344 |
| 6,496,489 | B1 | * | 12/2002 | Raith et al. .................. 370/328 |
| 6,636,738 | B1 | * | 10/2003 | Hayashi ....................... 455/450 |
| 2003/0081582 | A1 | * | 5/2003 | Jain et al. .................... 370/338 |
| 2003/0099221 | A1 | * | 5/2003 | Rhee ........................... 370/338 |
| 2003/0152053 | A1 | * | 8/2003 | Evans et al. ................. 370/338 |

* cited by examiner

*Primary Examiner*—Ricky Ngo
*Assistant Examiner*—Christine Ng
(74) *Attorney, Agent, or Firm*—Fay Kaplun & Marcin, LLP (57) ABSTRACT

A portable transreceiver system transmitting voice communications over a data network is described. The system has a portable transreceiver (WT) mode where multiple users are connected using semi duplex communications, and a private mode in which pairs of users are connected using full duplex communications. Wireless voice enabled terminals are used by the users, and are interconnected via a network such as the Internet.

26 Claims, 4 Drawing Sheets

VOICE OVER IP PORTABLE TRANSRECEIVER

This application claims the benefit of Provisional Application No. 60/372,219, filed Apr. 12, 2002.

FIELD OF THE INVENTION

The present invention relates to methods and systems that provide voice communications over a data network.

BACKGROUND OF THE INVENTION

In recent times there has been an increase in the use of portable two way radios, commonly referred to as walkie-talkies, in a variety of settings. Walkie-talkies have been long used in work-related activities, for example to let employees remain in contact with one another and with a central office. Typical uses include warehouse and retail settings, where workers are requested to move goods, and where specific employees can be summoned. Portable transreceivers are routinely used as an alternative to telephone communications in any setting where the communicating users are relatively close to one another. The security and public safety fields have been early users of walkie-talkies and related two way radio equipment, to help agents stay in contact and receive instructions.

More recently, as two way radio devices have become less expensive, recreational and family uses have become increasingly common for these devices. Family members use simple walkie-talkies to stay in touch and find each other, for example when hiking, skiing etc. Two way radios of various levels of sophistication have found a place in all types of sport and recreational events, to enhance safety and to increase the information level of the participants. Walkie-talkies have become almost a fashion accessory in certain cases, and have become available in various shapes and colors, ranging from inexpensive low power units to sophisticated units capable of encrypting their transmissions.

Typical walkie-talkies and other types of two way radios, however, suffer from various drawbacks that limit their usefulness in many situations. Perhaps the most serious limitation is the range of these devices, which often is very limited. Since the voice transmissions are carried from one station to another by radio waves, any physical obstacles to the propagation of those waves affects the range and quality of the received transmission. Most publicly available non-licensed 2 way radios are limited to a small power output (5 watts or less), which further limits their range. Interference from other radios or various sources of electromagnetic noise also affects reception quality. In addition, there is no mechanism in conventional radios to prevent two transmissions on the same frequency (or channel) from interfering with each other, without the source or the recipient of either transmission being aware of the interference. In many cases users have to carry various electronic tools such as portable computers or scanners, and having to carry an additional transreceiver device can be very cumbersome.

SUMMARY OF THE INVENTION

In one aspect, embodiments of the present invention include a system to provide voice communication over a data network which has wireless voice enabled terminals, access points connected to the data network adapted to exchange network messages over the data network, and a transmitter component of each of the terminals adapted to exchange data with the access points over a wireless network. The system also includes a software module executing on each of the terminals configured to provide a plurality of virtual channels, each of the virtual channels being carried over the wireless network. The software module is configured to enable reception of the voice communication from the terminals over a selected virtual channel, and to enable transmission of the voice communication to the terminals over the selected virtual channel.

DETAILED DESCRIPTION

The present invention may be further understood with reference to the following description and the appended drawings, wherein like elements are referred to with the same reference numerals. Conventional portable transreceiver radios, such as the Walkie Talkie™ manufactured by Motorola®, are used in a multitude of situations, both for pleasure and in work related settings. However, the performance of radio frequency (RF) based portable transreceivers is severely limited by inherent shortcomings of that technology. For example, the range of those radios is limited by the power of the transmitter, and the terrain separating transmitter and receiver. Only receivers within the transmitter's range can be contacted. RF based portable transreceivers generally can transmit on many channels, with each channel being assigned a discrete frequency so that only radios tuned to the same channel can receive the transmission. However, multiple radios may be transmitting on the same channel, so that a transmission from one radio may be "stepped over" by another radio's transmission, and neither radio transmission can be heard.

The present invention uses a different technology to provide Walkie Talkie™ like functionality to a voice enabled terminal. In addition, several features that are not available with RF based portable transreceivers may be implemented within the system according to the present invention. As will be described more fully below, communications between the voice enabled terminals travel over a data network, and thus are not subject to the same range limitations affecting RF based devices. There may be portions of the network that are based on radio communications, for example the sections connecting the wireless voice enabled terminal to a network access point. However, these are generally used over short distances, and do not affect the communications range between the various voice enabled units. According to embodiments of the invention, the voice enabled terminals have the "feel" and general usage characteristics of conventional RF portable transreceivers, so that their usage is intuitive to anyone familiar with the conventional RF units.

Figure 1:
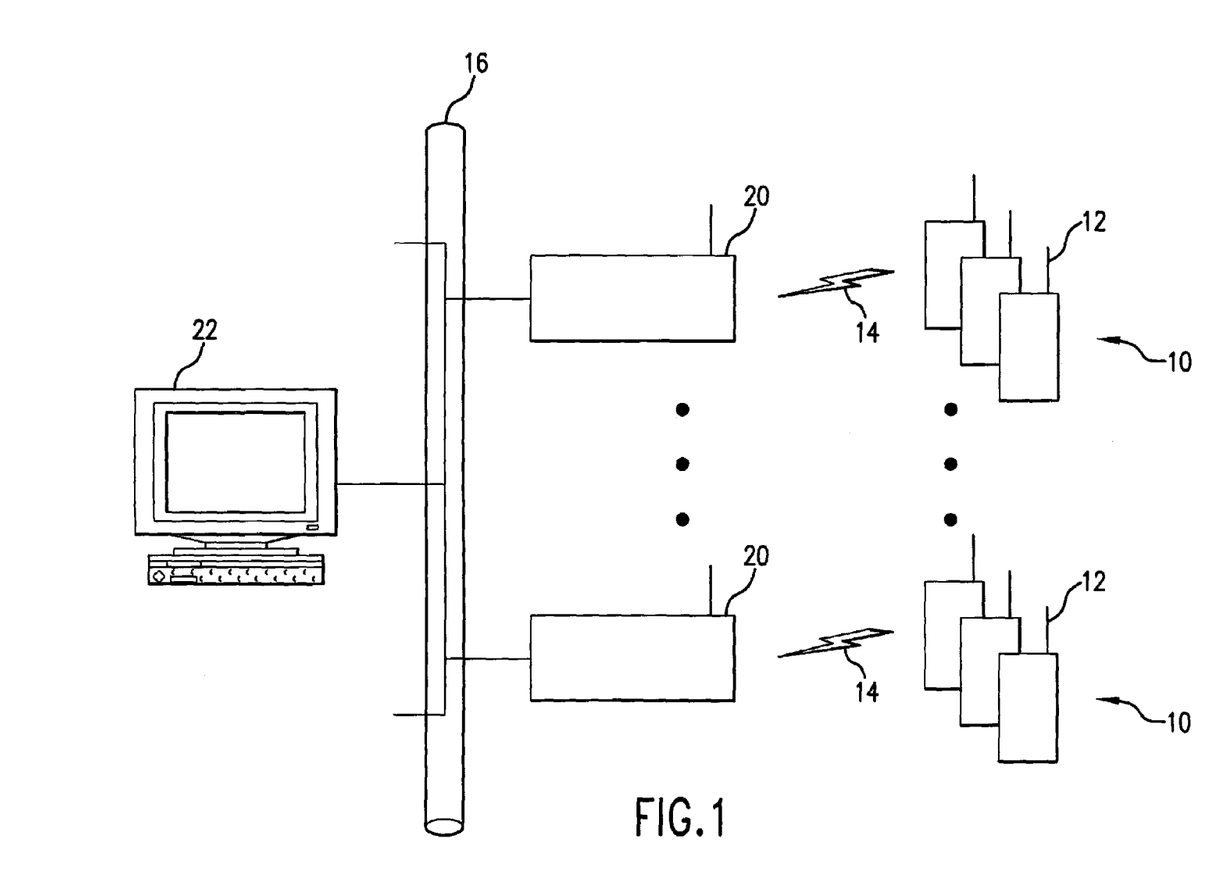
FIG. 1 shows wireless voice enabled terminals connected to a data network according to an exemplary embodiment of the present invention.

FIG. 1 shows one exemplary embodiment of a voice over IP (VOIP) portable transreceiver system, which mimics the functionality of RF based systems while incorporating additional features. In this embodiment, a plurality of voice enabled terminals 10 are interconnected and can provide voice communications amongst each other. Typically, each terminal 10 is given to an user or group of users. Since terminals 10 are portable, they are capable of connecting to a wireless network, and are sufficiently small to be easily carried. For example, terminals 10 may be specifically designed to be used as portable transreceivers, or may be hand held devices with different purposes, to which the portable transreceiver functionality has been added. In one embodiment, the terminal is based on a personal digital assistant (PDA) such as those using the Windows® CE operating system, or similar. The PDA may be a multi purpose PDA executing a software module which provides the portable transreceiver functionality, or may be a more specialized unit such as a PDA-scanner combination, which is also usable to read bar codes. As will be apparent to those skilled in the art, different types of voice enabled terminals may be used to communicate over the same data network, as long as they operate under compatible protocols.

Voice enabled terminals 10 include a transmitter section including an antenna 12, which enables them to communicate without being connected to wires. For example, a wireless local area network (WLAN) 14 may be used to connect each of the terminals 10 to access points 20. As long as the terminal 10 is within radio transmission range of at least one access point 20, the device can be used to communicate with any other terminals 10. A multi purpose WLAN 14 can be used, or the WLAN 14 may be a dedicated network used only for voice communications. Access points 20 form the connection between WLAN 14 and the data network 16 to which all terminals 10 are ultimately connected. Access points 20 act as a two way conduit, which receives radio transmissions from the transmitter section of terminals 10, and forwards the transmissions to the data network 16 using the appropriate protocols. For example, an internet protocol such as TCP/IP may be used to direct the transmission to its intended recipients on data network 16. Various levels of data processing may be carried out by access points 20, for example for error correction or encryption purposes.

Data network 16 is the principal means by which voice messages are carried between terminals 10. This network can be any network useable to transmit data, such as between microprocessors, and may be a local area network (LAN), a wide area network (WAN) or the Internet. Using a data network to carry the voice communications gives a distinct advantage to the system according to the invention. The range of the portable transreceiver-like terminals 10 is restricted only by the extent of data network 16. When the Internet is used for this purpose, the range of terminals 10 can be essentially unlimited, as long as an access point 20 connected to network 16 is within range of each of the users. The structure of data networks 16, such as the Internet, provides a certain amount of redundancy since in case of failure of certain segments of the network other segments can be used to carry the data. In addition, as will be described in greater detail below, the network protocol according to the present invention provides additional redundancy to minimize loss of data. The VoIP system of the invention thus is more robust than conventional RF based portable transreceivers, which are subject to disruptions and interference. The system according to the invention may also provide security benefits compared to RF based devices. Since the transmissions travel over the airwaves only for short distances at low power, it is more difficult to intercept them. Also, since the signals are already in a form that can be used by a microprocessor, encryption operations are easier to carry out, for example using the Kerberos or Wired systems.

In one exemplary embodiment according to the present invention, the VoIP portable transreceiver (WT) system provides packet-based voice communication between users of wireless voice enabled terminals, such as those based on PDA devices manufactured by Symbol Technologies. The exemplary wireless terminals operate under the 802.11 b standard for wireless LAN's, thus providing interoperability between products of different manufacturers. The exemplary embodiment uses direct sequence radio frequency transmissions. However, frequency hopping spread spectrum RF modes and other non RF modes, such as infrared transmissions, may also be employed within WLAN 14. One benefit of using the 802.11 b standard is that existing infrastructures using that standard may be adapted to support the VoIP WT system with minimal modifications. Most voice enabled terminal devices supporting that standard may be used as the portable transreceiver handset, often requiring simply a software upgrade to operate according to the invention.

One of the most basic capabilities of the VoIP WT system according to embodiments of the present invention is that it provides the user with an interface consistent with conventional RF based systems. The operation of the VoIP WT system should appear familiar to users accustomed to conventional RF devices. In one exemplary embodiment, terminals 10 execute software modules that provide multiple "virtual" communications channels, which appear to the user as analogous to the different frequency channels found on RF units. Each VoIP WT unit may be configured to have a primary channel that is used as the default channel for transmitting and for receiving, but the user can set the terminal to transmit and receive on any other desired channel, and to monitor some or all the available virtual channels. In the exemplary embodiment, the VoIP WT is capable of receiving and transmitting over at least 256 discrete channels. Although the exemplary unit is capable of receiving any or all of those 256 channels, those of skill in the art will understand that all the channels must still travel over a common WLAN, since there is no separate network for each channel. Accordingly, irrespective of the number of channels supported by the VoIP WT, the system can deliver simultaneously only as many messages as can be supported by data networks 14 and 16. The number of simultaneous messages that can be processed depends on the 802.11 b network architecture and on the specific site implementation.

In one embodiment, a channel may be dedicated as a priority channel, for example to be used for high priority security messages. All the units connected to the data network, such as terminals 10 on network 16, will receive the priority channel, and the messages received on the priority channel will override any other messages transmitted on different channels. When a message on the priority channel is received, all the units that are transmitting a message will abort the transmission, and notify the user that the transmission was discontinued. For example, an audible alert may be provided to the user for that purpose. Units that are in the receive mode will be prevented from starting a transmission while a priority message is being broadcast. All the units may have the ability to broadcast on the priority channel, or that feature may only be reserved for selected units.

When the portable transreceiver according to the present invention is not active on the default channel or on the priority channel, it is capable of monitoring any of an assigned group of channels for incoming transmissions.

However, before the unit is able to transmit on one of the monitored channels, a specific channel must be selected by the user. In another embodiment, units may be given the ability to transmit on multiple channels. Selecting a channel for transmission does not affect the channel that has been defined as the default channel for transmission and reception in a unit, which is also referred to as the designated primary channel of the unit. If a unit receives more than one message on different channels, which message is actually processed by the unit depends on a specific priority scheme. Priority or security broadcasts are handled first, so they are always played to the user. Priority messages are followed by messages broadcast on the unit's designated primary channel, and finally by broadcasts on any other of the monitored channels. Messages that are received on the monitored channels are not interrupted by another, later message with the same priority level. Within messages of the same priority, the earlier received message is played.

Conventional RF based portable transreceiver units do not have any mechanism to prevent more than one unit from simultaneously broadcasting on the same channel when the users press the PTT switch. The VoIP WT system according to the invention provides a mechanism to prevent this collision of transmissions. Before a transmission is permitted by one of the units, software in the unit is configured to verify that the channel selected is not already in use. If the selected channel is not in use, the transmission is broadcast normally. If, when the user presses the PTT switch a message is already being received on that channel, the transmit mode of the unit is disabled and a notification is issued to the user to indicate that the selected channel is busy.

Despite these precautions, a race condition can take place when two or more units have their PTT switches pressed simultaneously, while using the same channel. In that case, multiple portable transreceiver units may be allowed to begin their transmission streams. The race can be resolved by configuring each voice enabled terminal unit in the system so that no more than one message is heard by all the units on the channel, to prevent any two listeners from hearing different messages after the collision has been detected. Once a VoIP WT unit that is transmitting detects another transmission on the same channel, one of several acceptable actions may be taken. For example, all the units may stop transmitting, and may provide to the relevant users a notification of the race condition. Alternatively, a priority mechanism may be specified, to allow only one of the transmissions to continue, while suppressing all other interfering transmissions. As will be apparent to those skilled in the art, different priority schemes may be envisioned to prevent a broadcast collision from occurring. The principal requirements for this are that only one transmission per channel at a time be received by the users, and that the relevant users be notified when their transmission is suppressed.

As shown in FIG. 1, a directory server 22 may be connected to the data network 16 to provide a naming service for the system. A "group", in the context of the present invention, is a named list of users that subscribe to a particular channel. The VoIP WT system supports a common directory based on server 22 which allows the management of user groups. The implementation of this functionality requires the presence of a centralized server 22, and will thus be optional. The directory service is used to correlate a group name to a channel number, so that users don't have to remember which channel numbers correspond to which set of users. For example, a user may request that the VoIP WT unit monitor the "Purchasing" or the "Loading Bay 1" groups, without having to remember which channel numbers are associated with those groups. Changes to channel membership are centralized under this system, which simplifies maintenance of the groups information. In one example, a public API may be used to provide an application directory access to a centralized directory hosted on a server using the lightweight directory access protocol (LDAP). Alternatively, the application directory may access a local directory implemented in a static text file. One suitable LDAP directory server may be a server running Windows 2000®, particularly using Active Directory® software.

The system according to embodiments of the present invention can also provide a telephone-like caller ID on each terminal, which indicates to each user an identification of who originated a transmission. This feature of the terminals is not dependent on the directory service described above, although in some cases the directory service may be tied to the identification function. To provide the caller ID feature, a name that identifies either the unit or the person using the unit is sent in the transmission, together with the data packets describing the voice communication and any other pertinent data. Each receiving unit can then display the name of the sender or the originating terminal, as applicable.

Another feature that can be provided in a VoIP WT unit is the integration of a peer-to-peer private mode with the traditional portable transreceiver mode of operation. Traditional RF based WT units can only provide a one-to-many broadcast mode, where the transmission is half duplex, meaning that only one user at a time may speak. This is replicated in the WT mode of operation of the VoIP WT system. The private mode permits one-to-one calling between two users, with full duplex transmissions in which both addressees may speak simultaneously. This mode provides the same functionality as a telephone call between the two users. In one exemplary embodiment, a user at a receiving unit will be able to initiate a private callback to the initiator of the last, or most recently active WT mode message. In addition to the increased privacy aspects of using the private mode, additional benefits include reduced broadcast traffic, minimized distractions to other users not party to the peer-to-peer communication, and extended operating life of the non-participating units due to lower battery usage. This is possible since only two units participate in a private mode communication. Instead of tying up every terminal unit tuned to a specific virtual channel in the WT mode, users can select the private mode to limit communications to the two participating units.

Specialized message traffic rules may be used to prioritize the reception of peer-to-peer mode messages and of the normal WT mode messages. For example, if a WT mode message is received while the unit is participating in a peer-to-peer call, the peer-to-peer call is given higher priority. The user may be given a notification that a message is being received under the WT mode, and may be given the option of switching back to the WT mode of operation. In general, when a WT mode message has been received by a unit, the user can be given the option of responding to the message by using the normal broadcasting WT mode, or by using the private peer-to-peer mode. Selection of the WT mode may be made by simply pressing the PTT button of the unit. Peer-to-peer mode may be initiated by a separate soft or hard key, since it is not the default mode of operation of the VoIP WT device.

Another feature that is unique to the VoIP WT system according to embodiments of the present invention is the ability to store messages for future replay. In one embodiment, each portable transreceiver unit includes a memory that can buffer the most recent incoming voice message to provide a replay capability. In one embodiment, if the message is longer than the configured buffer size, only the last portion of the message will be saved. The user will then be able to replay the buffered message. In the case that a message is received while an earlier message is being played back, playback of the buffer may be interrupted to permit reception of the new message, particularly if the new message is received on the priority channel. An audio alert may be used to further notify the user that buffer playback has been suspended to receive a real-time message. In one exemplary embodiment, the buffer may be sufficient to store about 60 seconds of message.

According to embodiments of the invention, the VoIP WT system is designed to minimize network loading as much as practical, since it must operate in a network that is used also by other types of network traffic. Latency of the WT system is reduced as much as possible, but to a certain extent is dependent on the actual network architecture. Latency of the half-duplex WT mode is not as critical as latency of the full-duplex private mode, since in WT mode multiple participants cannot speak simultaneously but instead have to take turns speaking. The network protocol chosen for the invention takes advantage of this lessened requirement of the WT mode to include redundant transmission of the voice data. This adds some latency to the message, but greatly improves the quality of the message. The redundant transmission allows the receiver to reconstruct missing voice data due to network interference or errors.

In one embodiment, the latency in the WT mode from the microphone of the transmitting unit to the speaker of the receiving unit averages less than 500 milliseconds, excluding network delays. In the peer-to-peer or private mode, the latency from the transmitter's microphone to the receiver's speaker is less than 300 milliseconds, also excluding network delays. Various signal compression methods may be used to reduce the amount of bandwidth used by the VoIP WT application. For example, a G.729A codec is provided for voice compression, however other more effective methods may also be incorporated.

Figure 2:
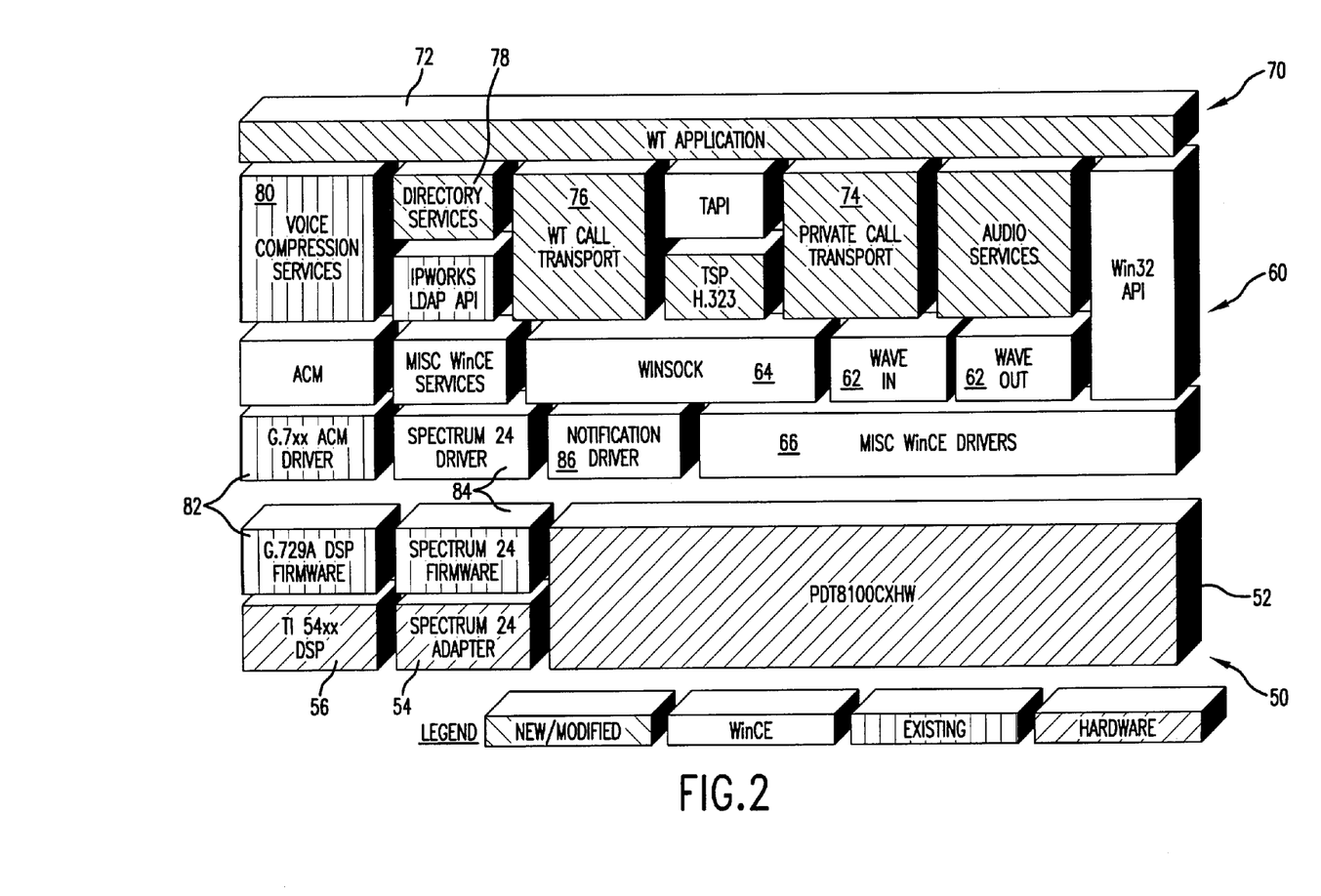
FIG. 2 shows a diagram representing a software architecture of a voice enabled terminal according to an embodiment of the present invention.

FIG. 2 is a diagram showing an exemplary embodiment of the software architecture and hardware interface used to control a VoIP WT unit such as the voice enabled terminal 10. FIG. 2 shows the software as applied to a PDT8100X3 platform, manufactured by Symbol Technologies®, using the 802.11 b protocol. The exemplary platform is a hand help PDA that also includes a bar code scanner in addition to the portable transreceiver features, and is particularly useful where users need to communicate with one another and to identify merchandise, such as in a warehouse. It will be apparent to those of skill in the art that a similar software architecture can be used in different voice enabled devices, without affecting the functionality of the device. In the example, an hardware interface 50 includes the PDT8100X3 unit 52 and a Spectrum 24 adapter 54 having a radio network card with a transmitter/receiver used to connect terminal 10 to the access points 20 via WLAN 14. The hardware component also includes a digital signal processor (DSP) 56, used to process the voice communications, such as to perform signal compression tasks.

The software components include software elements 60 that are part of the Windows CE® operating system, and software elements 70 that are specific to the portable transreceiver application, both of which are executed on a processor of the voice enabled device. It will be apparent that other operating systems adapted to run on portable devices may be used, such as Palm® operating systems, etc. Windows CE® operating system components 60 are well known in the art, and include Wave in and out modules 62 to process sounds, Winsock module 64 to manage network sockets, and various drivers 66 for the display screen, etc. Additional software modules may be included with software elements 70, which are developed specifically to manage operation of the VoIP WT functionality. The WT application module 72 is the primary application that enables terminal 10 to be used as a portable transreceiver. WT application module 72 is designed to minimize interference with other applications that may be executed simultaneously on the unit, in particular other applications that use the notification driver 86 to provide audio cues.

Generally, the WT application module 72 operates in the background on the device, so that the full screen of the device (i.e. terminal 10) may be used for other applications. The application interface may be displayed automatically when needed, such as when an incoming message is detected. If the user needs to see the VoIP WT application interface, for example to see the caller ID function, a "display pop" key may be provided to toggle the WT application interface from the background to the foreground, and vice versa, each time it is pressed. This toggle key may be a physical button or a touch screen region of the device. To maximize battery life, the user has the option of operating in a low power mode, which may be entered by using a key. This mode blanks the screen and may perform other functions to reduce power consumption. In power save mode the unit is fully functional and can send or receive voice messages. If the user wants to see the screen, a key may be pressed to resume normal operations. If an event occurs which requires the user to see the screen, normal mode may be resumed automatically.

Private call transport module 74 enables the terminal 10 to be used in private mode communications, as described above. This mode uses, for example, the H.323 session protocol for telephone-like full duplex performance. Private call transport module 74 typically does not provide session control, since that is handled by the H.323 protocol. In one embodiment, the application accesses H.232 for session control through the Microsoft Telephony API (TAPI). The Telephony service provider (TSP) manages call setup, call tear down and call control via the H.323 stack, and negotiates a common compression codec with the destination unit. To prolonge battery life, module 74 may also include power management functions, such as switching the unit between the power save mode (PSP) and the full power mode (CAM) as necessary.

To maximize battery life the unit normally operates in the lowest power mode. When a transmission is made, the unit is switched to full-power mode. When the unit is in standby mode, for example when waiting for an incoming message, the unit watches for a wake-up message, which is sent prior to a transmission as part of the protocol. If a wake-up message is received, the unit switches to full power mode. Since it is possible for a wake-up message to be lost, the radio also watches for regular voice packets. Therefore, if one of the regular voice packets is detected, the unit is also turned on to full power mode. After the last packet in a transmission is received, the unit waits a short time interval to see if additional packets will be received. If there are no additional data packets within a specified timeout period, the unit switches back into the low-power mode.

The normal portable transreceiver mode of operation for terminal 10 is implemented through WT call transport module 76. Module 76 provides one-to-many half duplex communications that replicate the functioning of a RF portable transreceiver. In the exemplary embodiment the voice signals are sent using a multicast realtime transport protocol (RTP) standard for streaming, using a packet switched network. WT call transport module 76 also provides a method to increase the audio quality of the transmission over an unreliable network. Since transmission over a data network can be unreliable and subject to various data errors, some form of error correction mechanism is required. The transmission of voice data must occur in real time, thus re-broadcasting the data packets representing the voice communication is not feasible. According to embodiments of the invention, a simple redundancy scheme is used, in which each voice data packet is transmitted multiple times, and is reassembled at the receiver. Any missing information from any of the transmissions is likely to be present in the redundant transmission. In one exemplary embodiment, two redundant packets are used, resulting in each voice sample being sent three times.

The directory service described above is implemented through the directory services module 78 of software elements 70. Directory services module 70 manages the interaction with server 22, which provides naming services for groups of users. Additional modules that are part of the software elements 70 include the firmware and the drivers 84 that manage the operation of the spectrum 24 adapter, to enable the radio communications to access WLAN 14. Also included is a voice compression services module 80, which carries out voice compression operations to reduce the amount of network traffic required to transmit the voice data. In the exemplary embodiment, module 80 interacts with the firmware and driver 82 providing G.729A codecs for compression, which is carried out by the digital signal processor 56. It will be apparent to those skilled in the art that the software architecture describe herein is exemplary only, and that the same functionality may be obtained using different operating systems and software configurations.

Figure 3:
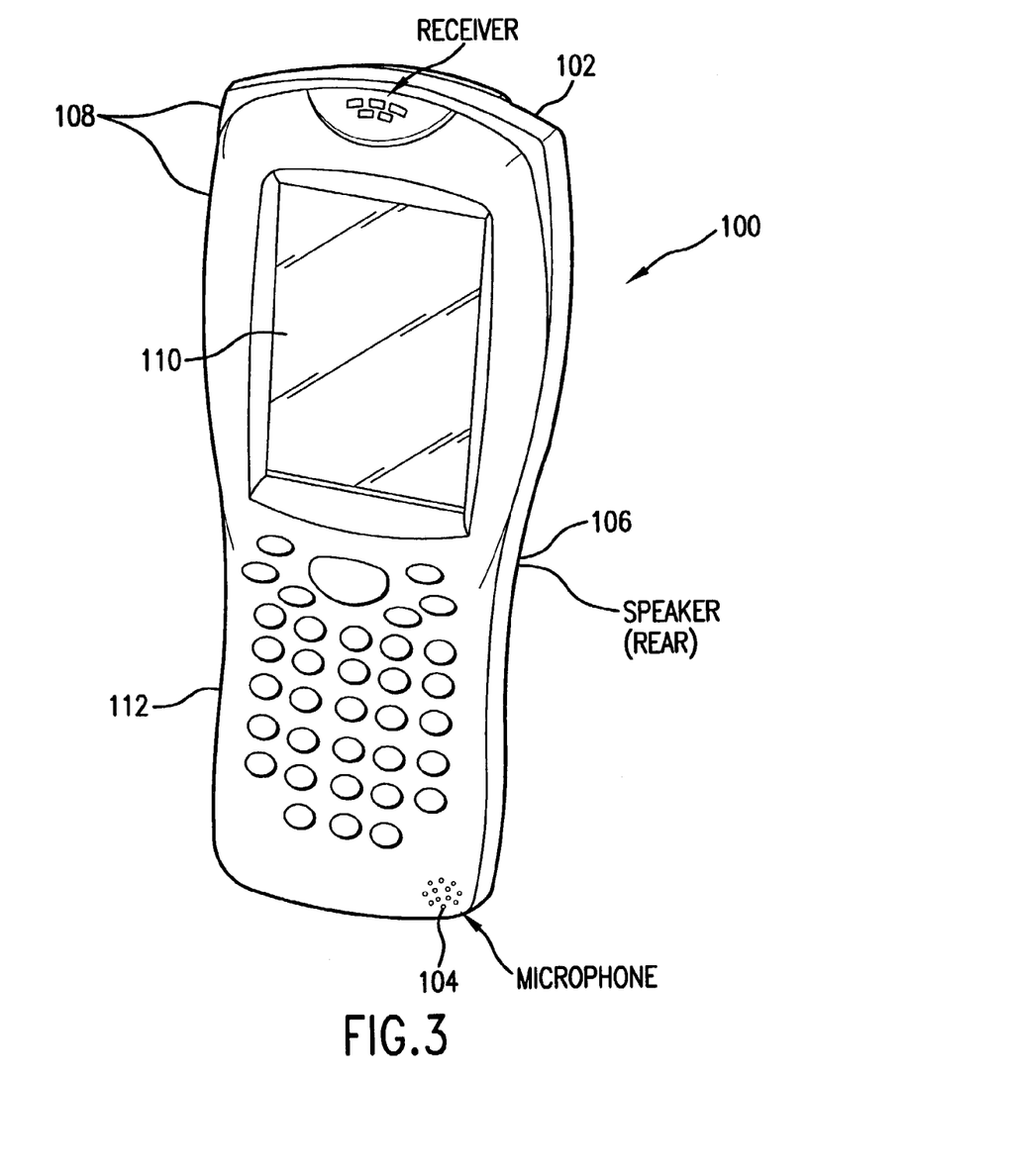
FIG. 3 shows an exemplary voice enabled terminal according to an embodiment of the present invention.

FIG. 3 shows a perspective view of an exemplary voice enabled terminal 100 according to the invention. Terminal 100 is based on Symbol Technologies' PDT8100X3 portable data terminal, and includes a transmitter/receiver component 102 used to connect with WLAN 14. For example, transmitter/receiver component 102 may be a Spectrum 24 wireless network radio card used to transmit outbound voice communications and receive inbound voice communications. The primary components of terminal 100 are a microphone 104 and a speaker 106 which are adapted to reproduce the frequency range of human voice. Remote speakers and microphones may also be provided, connectable to terminal 100 with jacks. A push to talk (PTT) button 108 is included to initiate a transmission, as is done in RF portable transreceivers and CB radios. Although this function could be carried out with a soft key or a screen command, a physical PTT button is more natural and easy to use. In cases where the unit is usable for multiple purposes, PTT switch 108 may also perform different functions, depending on which application is being executed by terminal 100. A display 110 may also be included to present to the user a graphical interface to access the VoIP WT system and other applications. A keyboard 112 may be provided, to enter commands and to select options within the WT application, and for other applications that are executable by terminal 100.

Figure 4:
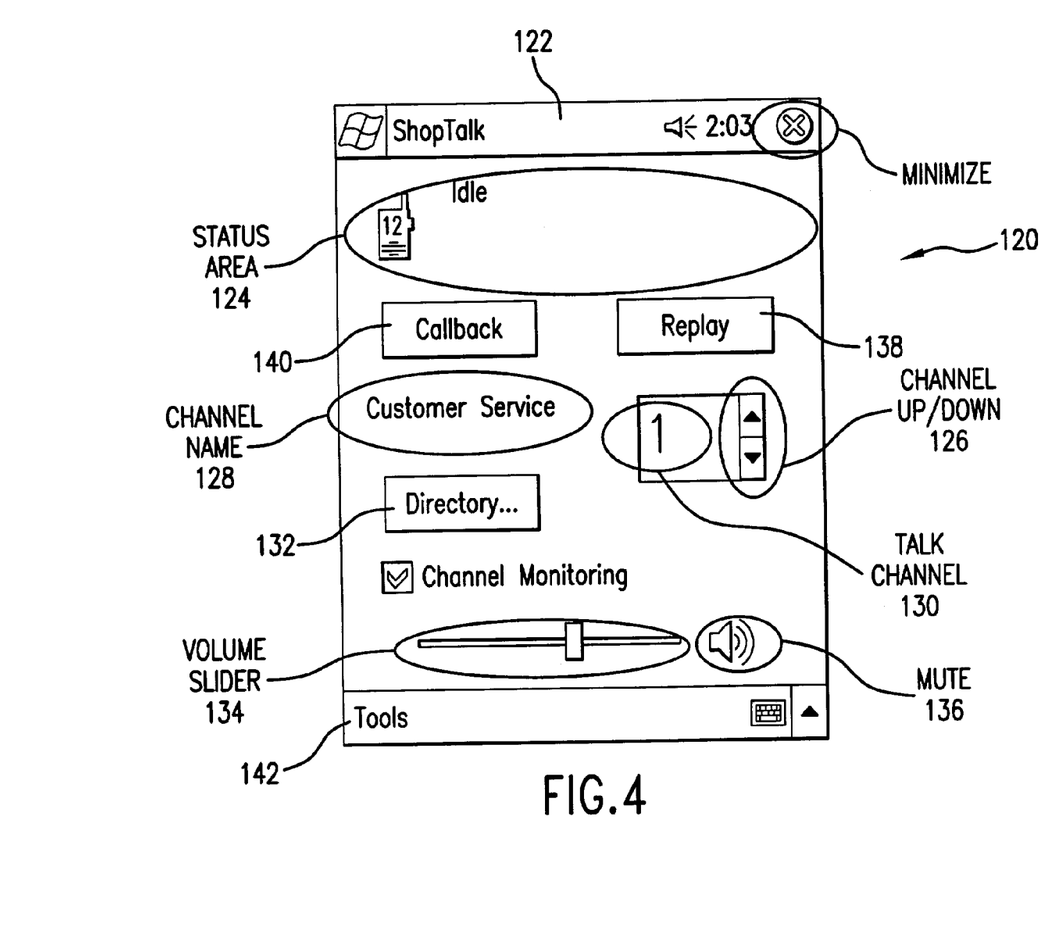
FIG. 4 shows an exemplary screen shot of the controls for the voice enabled terminal according to one embodiment of the invention.

An exemplary screen shot of display 110 is shown in FIG. 4. In this example, the WT application runs under the Microsoft Windows CE operating system, or the Microsoft Pocket PC 2002 operating system. As indicated above, the PTT switch is preferably a physical switch, but other functions of the WT application may be selected using soft keys and/or the touchscreen 110 of the device. Normally the WT application executes as a background process, and only shows as a small icon on the PDA's display. When a transmission is received, the WT application is activated, and a display such as display 120 is shown. Display 120 is preferably designed to follow the operating system's convention, such as having a top bar 122 with the name of the application and a button to minimize the window. A status area 124 may be provided to indicate whether the portable transreceiver system is idle, operating in the WT mode, or in the peer-to-peer mode. Additional status messages may be displayed as necessary. A pair of touch sensitive keys 126 can be used to select the channel to be monitored and the channel to be used for transmitting. The channel number is displayed in field 130, and the channel name in field 128. If required, submenus may be provided to select multiple channels or groups to be monitored. A directory key 132 is used to bring up additional screens that allow the user to access the naming service of server 22.

Several other functions of the WT application may be selected either with physical buttons or touch sensitive areas of the display. For example, a volume bar 134 and muting button 136 may replace or supplement physical volume controls of terminal 100. A replay button or touch sensitive area 138 can be used to play back a portion of the latest received voice message, and an additional screen may be invoked to let the user set recording and playback parameters. A callback area 140 is provided to let the user initiate a peer-to-peer communication with another user. In a simple form, when key 140 is pressed, the user that originated the last communication received would be called back. In more sophisticated applications, a different screen may be provided which lets the user select whom to contact in the peer-to-peer mode. Additional screens may be provided as needed, to let the user select options and set parameters for the various functions of the WT application. A "tools" key 142 may be provided to access functions not shown on primary screen 120. It will be apparent that the specific screen configuration and layout of the physical controls and touch screen areas can vary depending on the design of the unit and the operating system being used.

The present invention has been described with reference to specific embodiments associated with a multi purpose PDA running the Windows CE operating system. However, other embodiments may be devised that use different platforms and software without departing from the scope of the invention. Accordingly, various modifications and changes may be made to the embodiments without departing from the broadest spirit and scope of the present invention as set forth in the claims that follow. The specification and drawings are accordingly to be regarded in an illustrative rather than restrictive sense.

The invention claimed is:

1. A system to provide voice communication over a data network, comprising:
   wireless voice enabled terminals;
   access points connected to the data network adapted to exchange network messages over the data network;
   a transmitter component of each of the terminals adapted to exchange wireless messages with the access points over a wireless network; and
   a software module executing on each of the terminals configured to provide a plurality of virtual channels, each of the virtual channels being carried over the wireless network and the data network, wherein the software module is configured to:
enable reception of the voice communication and to enable transmission of the voice communication over selected virtual channels; and
initiate a peer to peer full-duplex call with a selected one of the terminals, wherein
the peer to peer full duplex call overrides reception and transmission of the voice communication over the plurality of virtual channels.

2. The system according to claim 1, wherein the software module is configured to enable half duplex transmission and reception on the virtual channels.

3. The system according to claim 1, further comprising a speaker and a PTT switch of each of the terminals.

4. The system according to claim 1, wherein the software module is configured to prevent collision of transmissions on each of the virtual channels.

5. The system according to claim 4, wherein transmission on an active channel is disabled when the active channel is in use.

6. The system according to claim 4, wherein a user notification is generated when initiating transmission on one of the selected channels if the selected channel is in use.

7. The system according to claim 1, wherein the software module is configured to prioritize simultaneous transmissions on each of the selected channels, such that only one of the simultaneous transmissions is enabled.

8. The system according to claim 1, further providing a priority channel enabled to override transmission and reception on the plurality of virtual channels.

9. The system according to claim 1, wherein the selected one of the terminals originates a voice transmission received over one of the plurality of virtual channels.

10. The system according to claim 1, further comprising a memory of each of the terminals adapted to store and replay a portion of the voice communication.

11. The system according to claim 1, wherein the software module is configured to transmit redundant data packets representing the voice communication.

12. The system according to claim 1, further comprising a directory service of the data network adapted to associate names with the virtual channels.

13. The system according to claim 12, wherein the associated name is displayed on the terminals.

14. The system according to claim 1, wherein the software module compresses data packets representing the voice communication before transmission.

15. The system according to claim 1, wherein the software module is configured to operate the voice enabled terminals at a reduced power level.

16. A portable voice enabled terminal comprising:
a transmitter section adapted for exchanging data with an access point via a wireless network, the access point being connected to a data network; and
a processor adapted to execute software instructions, the software instructions comprising:
instructions to provide a plurality of virtual channels carried over the wireless network and the data network;
instructions to generate data packets representing an outbound voice communication, and transmit the data packets over selected ones of the virtual channels;
instructions to receive data packets over the selected ones of the virtual channels and regenerate an inbound voice communication from the data packets; and
instructions to initiate a peer to peer full-duplex call with a selected one of the terminals, wherein the peer to peer full duplex call overrides reception and transmission of the voice communication over the plurality of virtual channels.

17. The voice enabled terminal according to claim 16, wherein the processor further comprises instructions to establish semi duplex communications over selected ones of the virtual channels.

18. The voice enabled terminal according to claim 16, wherein the processor further comprises instructions to establish a full duplex communication with a selected addressee.

19. The voice enabled terminal according to claim 16, wherein the instructions further comprise disabling transmission of the data packets over a virtual channel that is in use.

20. The voice enabled terminal according to claim 16, wherein the instructions further comprise transmitting the data packets redundantly.

21. The voice enabled terminal according to claim 16, further comprising instructions to monitor selected ones of the virtual channels for the data packets.

22. The voice enabled terminal according to claim 16, further comprising a digital signal processor adapted for compressing the data packets.

23. The voice enabled terminal according to claim 16, further comprising a dedicated push to talk button.

24. The voice enabled terminal according to claim 16, further comprising a memory module adapted for storing the inbound voice communication.

25. The voice enabled terminal according to claim 16, further comprising a display adapted to show a user interface of the software instructions.

26. The voice enabled terminal according to claim 25, wherein the display shows an origin identification of the inbound voice transmission.

* * * * *

UNITED STATES PATENT AND TRADEMARK OFFICE
CERTIFICATE OF CORRECTION

| | | |
|---|---|---|
| PATENT NO. | : 7,023,821 B2 | Page 1 of 1 |
| APPLICATION NO. | : 10/338938 | |
| DATED | : April 4, 2006 | |
| INVENTOR(S) | : Wotherspoon et al. | |

It is certified that error appears in the above-identified patent and that said Letters Patent is hereby corrected as shown below:

In the title page, item 73 assignee's name should be "Symbol Technologies, Inc.".

Signed and Sealed this

Fifteenth Day of August, 2006

JON W. DUDAS
*Director of the United States Patent and Trademark Office*